FIG. 1

INVENTOR.
SAM A. JONES
BY
*Harry B. Keck*
ATTORNEY

March 17, 1959  S. A. JONES  2,877,896
METHOD AND APPARATUS FOR SEPARATING MATERIALS
OF DIFFERENT SPECIFIC GRAVITY
Filed Feb. 25, 1955  4 Sheets-Sheet 2

*INVENTOR.*
SAM A. JONES

BY

Harry B. Keck
ATTORNEY

March 17, 1959 S. A. JONES 2,877,896
METHOD AND APPARATUS FOR SEPARATING MATERIALS
OF DIFFERENT SPECIFIC GRAVITY
Filed Feb. 25, 1955 4 Sheets-Sheet 3

FIG. 3

Inventor
SAM A. JONES

By Harry B. Keck
Attorney

March 17, 1959  S. A. JONES  2,877,896
METHOD AND APPARATUS FOR SEPARATING MATERIALS
OF DIFFERENT SPECIFIC GRAVITY
Filed Feb. 25, 1955  4 Sheets-Sheet 4

FIG. 4

Inventor
SAM A. JONES

By Harry B. Keck
Attorney

United States Patent Office 2,877,896
Patented Mar. 17, 1959

2,877,896

METHOD AND APPARATUS FOR SEPARATING MATERIALS OF DIFFERENT SPECIFIC GRAVITY

Sam A. Jones, Pittsburgh, Pa., assignor to Consolidation Coal Company, a corporation of Pennsylvania Application February 25, 1955, Serial No. 490,609

12 Claims. (Cl. 209—172.5)

This invention relates to an improved method and apparatus for the separation of particulate solid materials with different specific gravities. More particularly it relates to those heavy density fluid media separations which are carried out in conical separation zones.

The present invention is particularly useful in controlling the separation of coal from the usual mined mixture of coal and rock or other refuse. Commonly this separation of coal from rock, slate and the like is carried out in conical vessels.

The principle of separation systems employing a conical vessel is quite simple. The conical vessel is filled with a fluid mass of dense finely divided solids suspended in water; any material fed to the cone with a density lower than that of the fluid mass will float and a material with a higher density will sink within the cone. The heavy density fluid comprises a slurry of water and sand or similar comminuted material heavier than water in such proportions that the slurry density is between that of water and that of the sand. Sand and water are fed into the cone in proportions which will provide a dense media having approximately the desired specific gravity for effecting the separation of raw coal. Sand is introduced into the top of the cone as a dense aqueous slurry; water is introduced through injection nozzles positioned at various points along the conical surface. The upward velocity of the water tends to maintain the sand in suspension. In existing installations no attempt is made to measure and control the density of the media instantaneously within the separation cone. Instead cone operators resort to "rule of thumb" methods for correcting process difficulties. At the present time, the cone operator obtains a "grab test" sample of the float and sink products every half hour or so for testing in a "true gravity solution." From these tests, the operator determines whether his media gravity is abnormal and makes valve adjustments in the water injection system to compensate. The accuracy of compensation is not discovered until the subsequent "grab test" sample has been evaluated. Consequently, the actual density of the media is subject to fluctuations, permitting variations in product quality to occur; considerable production time is lost because of frequent plugging of the cones. The variations in density and resulting variations in product quality are reflected in rejected cars of coal which are off standard. At the same time, good marketable coal is lost in the refuse stream with a corresponding loss of profit.

Cone difficulties are particularly acute when the raw coal feed has a high fraction of "near-gravity" material. "Near-gravity" material is that portion of the feed coal having a density approximating the desired separation density. For example, where the product separation occurs at a specific gravity of 1.45, that fraction of the raw coal having a density of 1.40 to 1.50 would be considered "near-gravity" material. It is not uncommon for the "near-gravity" material to comprise 30 percent and even more of the raw coal. When this "near-gravity" material is introduced into the separation cone with the raw coal, it tends to remain in suspension in the separation zone; that is, it tends neither to float nor to sink. Accordingly the "near-gravity" material accumulates in the dense media and hinders the downward settling of rock, slate and the like. The presence in the cone of the "near-gravity" material and the hindered rock, slate and the like increases the average gravity of the separation media in the bottom portion of the cone until even the normal "sink" materials begin to accumulate. Thus accumulation begets more accumulation and frequently results in plugging of the cone, necessitating a plant shutdown. While the material accumulates within the cone, the general increase in gravity of the separation media causes some high gravity solids to be entrapped in the normal float material and to be discharged with the product coal thereby increasing the product ash content.

In accordance with the present invention accumulations of refuse material in the cone are avoided by establishing and maintaining, instantaneously and automatically, a satisfactory density pattern in the separation media within the cone. More important than avoiding refuse accumulations, however, the present invention also markedly increases the efficiency of coal cleaning operations. The density pattern of this invention prescribes a low density layer of media (essentially water alone) at the upper surface of the cone, a subjacent zone several feet deep having the average density of the desired separation, and underlying zones of lesser density beneath the separation zone to assure rapid downward movement of the heavy refuse materials. According to my invention a series of horizontal zones is established downwardly through the separation cone. The actual separation of coal from impurities occurs just beneath the media surface in that horizontal zone which is maintained at the desired density of separation. The average density of the media in the zones subjacent to the actual separation zone is maintained at a lower value than that of the separation zone to assure that the heavy refuse and the "near-gravity" material will quickly drop out of the cone without producing accumulations. To obtain this desired density pattern for the separation media I continuously automatically measure the average density of the media in the actual separation zone and provide apparatus for automatically introducing water into the cone for maintaining the average media density constant in the actual separation zone.

For a full understanding of the present invention and its objects and advantages, reference should be had to the following description and the accompanying drawings in which.

Figure 1:
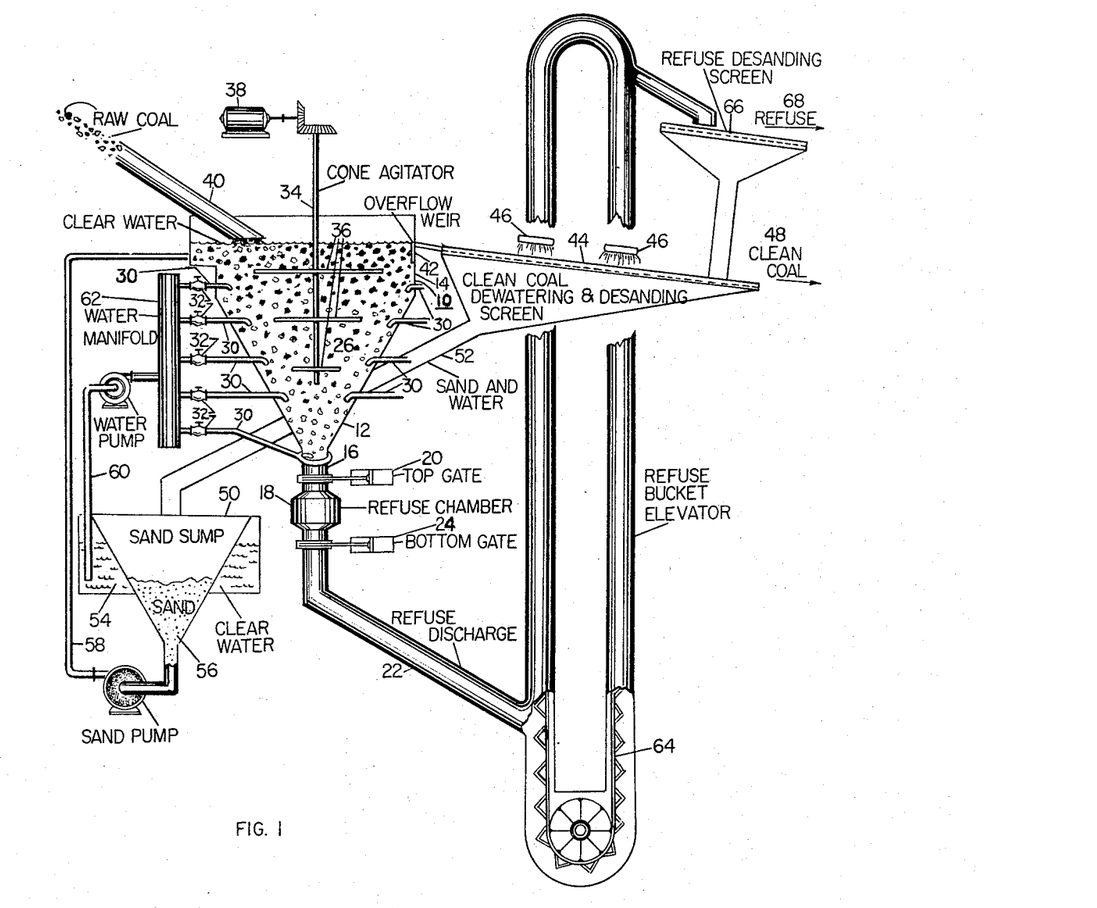
Figure 1 is a schematic illustration of a typical cone separation system.

A typical cone separation system, illustrated schematically in Figure 1, shows the environment in which the present invention is carried out. The separation vessel proper 10 is essentially a cone having slanting side walls 12 and contiguous cylindrical section 14 mounted above the cone. A conduit 16 extends downwardly from the vertex of the cone. A refuse chamber 18 which functions as a lockhopper for cyclically discharging refuse material communicates with the conduit 16 when the top gate valve 20 is open. The refuse chamber 18 communicates with a refuse discharge conduit 22 when the bottom gate valve 24 is open. Operation of the two gate valves 20 and 24 is so controlled that only one is open at any given moment.

The separation zone 10 is filled with a heavy density fluid 26 comprising a mixture of sand and water having a specific gravity whose value can be controlled by varying the ratio of sand to water. Sand in the form of a dense slurry enters the separation zone 10 from a conduit 58 at the upper level of the separation media. Clear water enters the separation zone 10 through conduits 30 having manually adjustable valves 32. The weight ratio of the sand entering through conduit 58 to the water entering through conduits 30 determines the average density of the fluid 26. An agitator having a vertically mounted shaft 34 and horizontally rotating agitating cross arms 36 depends into the cone 10 to provide agitation which promotes settling of impurities. A motor 38 is provided to rotate the agitator shaft 34.

In operation raw coal is introduced near the upper fluid surface of the media 26 through a coal chute 40. The white particles indicate the heavy, high ash material in the raw coal feed; the black particles indicate the light, low ash marketable coal. The raw coal immediately sinks below the surface of the fluid 26 through a thin layer of water which is maintained at the top level. Beneath this layer of water and within the layer of separation fluid, those particles in the raw coal having a lower density than the dense media of the separation zone are floated. Those impurities in the coal having a density greater than that of the separating fluid sink downwardly toward the vertex of the cone. The very heavy impurities sink quite rapidly, whereas those impurities having a density approximating that of the separating fluid tend to remain at the separation level because they lack the tendency to sink or to float. The descending refuse passes downwardly through the cone into the conduit 16 and thence into the refuse chamber 18 during that part of the cycle in which the top gate valve 20 is open. Cyclically the top gate valve is closed and the bottom gate valve opened to permit the refuse from the chamber 18 to descend into the refuse discharge conduit 22. Thereupon the bottom gate valve 24 is closed and the top gate valve 20 reopened to permit the accumulation of refuse within conduit 16 to enter the chamber 18 for disposal.

In some installations the refuse chamber 18 and the valves 20 and 24 are eliminated so that the heavy media in the separation cone 10 communicates directly with the discharge conduit 22. The latter is connected to a refuse bucket elevator 64 which is filled with clear water to a level slightly higher than the level of heavy media in the cone 10. The level of clear water in the bucket elevator 64 is maintained by the hydrostatic head of media in the cone 10 which balances the clear water head. In such installations, refuse withdrawal is continuous.

In passing from the coal chute 40 through the separation vessel 10, the low gravity coal floats in the separation media 26. The top layer of the fluid in the vessel 10 continuously overflows a weir 42 providing a stream of water, sand and low density coal for separation in the clean coal dewatering and desanding screen 44. Sand and water pass through the openings of the screen 44 and are separated from the larger pieces of clean coal which are incapable of passing through the screen. To assure recovery of the sand which may be adhering to the moist coal, water sprays 46 can be provided to rinse the product coal which is recovered at 48. Sand and water screened from the coal product pass to a sand sump 50 through a conduit 52. In the sand sump 50 clear water 54 is separated from a dense sand slurry 56. The dense sand slurry is continuously pumped through conduit 58 to the upper level of separation media 26. Clear water 54 is continuously pumped through a conduit 60 to a clear water manifold 62 for re-entrance into the cone 10 through the conduits 30.

From the refuse discharge conduit 22, impurities from the raw coal are picked up in the bucket elevator 64 and discharged onto a refuse desanding screen 66. Sand and moisture from the refuse pass through the screen 66 and are returned to the sand sump 50 together with the sand and water passing through conduit 52. In some installations the sand and water recovered through the screen 66 are returned directly to the separation vessel 10 by a conduit or sluice which deposits them into the top layer of the separation media 26. The refuse impurities are discharged from the system at 68.

The specific gravity of the separation media should be as high as consistent with the desired product quality in order to obtain maximum recovery of product from the raw coal. To illustrate this point, data from float and sink tests with a typical Pittsburgh seam bituminous coal are presented in Table I.

*Table I.—Float-sink test of typical raw bituminous coal*

| Float and Sink Gravity | Differential Analysis | | Cumulative Analysis | |
|---|---|---|---|---|
| | Wt. Percent in Fraction | Wt. Percent Ash | Wt. Percent in Fraction | Wt. Percent Ash |
| less than 1.35 | 68.6 | 4.83 | 68.6 | 4.83 |
| 1.35–1.40 | 5.7 | 13.17 | 74.3 | 5.47 |
| 1.40–1.45 | 4.9 | 19.62 | 79.2 | 6.35 |
| 1.45–1.50 | 5.1 | 24.54 | 84.3 | 7.45 |
| 1.50–1.55 | 2.2 | 29.74 | 86.5 | 8.01 |
| 1.55–1.60 | 1.3 | 33.00 | 87.8 | 8.38 |
| 1.60–1.70 | 3.5 | 42.07 | 91.3 | 9.67 |
| 1.70–1.90 | 6.4 | 51.36 | 97.7 | 12.41 |
| more than 1.90 | 2.3 | 70.70 | 100.0 | 13.75 |

The data in Table I show that the low gravity material in raw coal is low in ash content as expected. Also as expected the fractions having increasing gravities have an increasing ash content. From the cumulative analysis it is seen that perfect separation of the coal of Table I at a specific gravity of 1.45 would yield a product coal having an ash content of 6.35 and comprising 79.2 percent of the raw coal. However, where the customer is willing to accept coal having an ash content of 8 percent, it should be possible to recover about 86.5 percent of the raw coal as a marketable product by conducting the separation at a specific gravity of 1.55. Thus an additional 7.3 percent of the raw coal can be sold as a product. The saving would amount to 730 tons per day in a cleaning plant having a capacity of 10,000 tons of raw coal per day. The inherent danger in operating existing heavy media separation systems at the highest specific gravity consistent with the desired product is that fluctuations in the density of actual separation will permit higher density material to pass out into the product stream so that the average ash content of the day's production exceeds the customers' specification. Accordingly cleaning plant operations currently are conducted at a sufficiently low nominal gravity to allow for the fluctuations in density of the media which inherently occur in existing equipment. It is not uncommon in such current operations that the refuse stream indicated at 68 in Figure 1 may contain as much as 25 percent by weight of low gravity, low ash coal destined for loss in refuse piles along with the actual sink material.

The coal used for the analyses of Table I illustrates a normal distribution of "near-gravity" material. For a separation at 1.45 specific gravity, the "near-gravity" (i. e. 1.40 to 1.50) material is 10.0 wt. percent of the raw coal. This 10 percent fraction of the coal tends to remain in suspension within the separation zone since it has a tendency neither to float nor to sink. Accordingly the coal described in Table I would present operating difficulties in an existing dense media cone separation system. However, I have provided a method for regulating the specific gravity of the actual separation zone to a constant desired value which can be accurately controlled (to within ±0.01 specific gravity unit in most cases) to assure quality uniformity of top product. Concurrently the media gravity below the actual separation zone is maintained at a value less than that of the actual separation zone to eliminate holdup of "near-gravity" material, thereby avoiding plugging of the cone.

Figure 2:
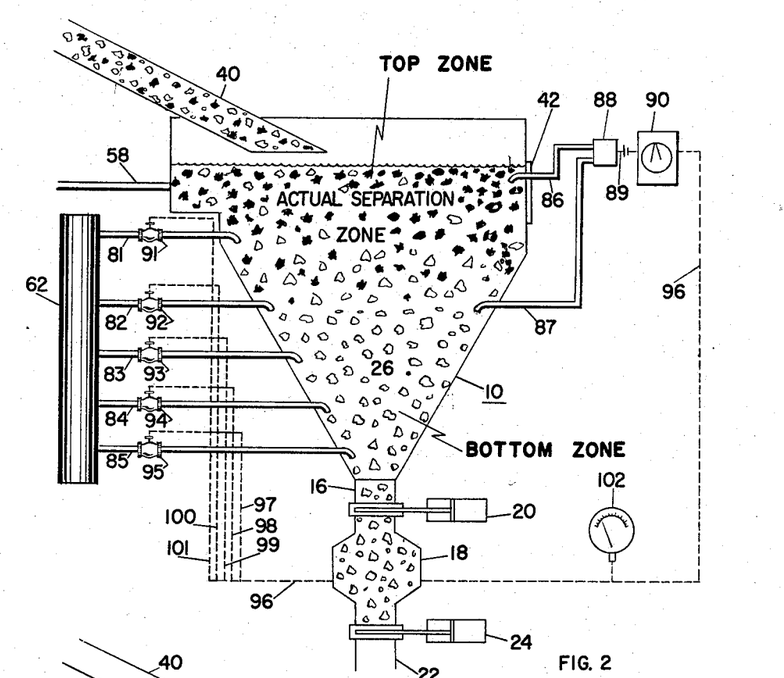
Figure 2 is a schematic illustration of apparatus for carrying out the present invention.

In accordance with the present invention the separation zone is arbitrarily divided into three horizontal zones. Figure 2 is an enlarged illustration of those elements of Figure 1 which are essential to explanation of my present invention. Where numerals of Figure 2 correspond to numerals of Figure 1, the elements also correspond. Differing numerals in Figure 2 indicate the changes and additions required in the present invention. The uppermost zone, wherein the separation media consists essentially of clear water with very little sand, has a low gravity. In this uppermost zone there exists a generally horizontal flow of separation media toward the overflow weir 42. Horizontally flowing water in this top zone lacks the necessary upward velocity component required to maintain the sand in suspension; in fact the upper surface of the media is essentially clear water. Hence the media density of the upper zone is always less than the gravity of the desired separation. Accordingly all the raw coal sinks through this upper zone downwardly to the actual separation zone which comprises the highest media density existing within the cone.

In this actual separation zone, the specific gravity of the heavy media is closely controlled in accordance with the present invention. This actual separation zone is defined vertically by the position of two pressure impulse conduits 86 and 87 which are in open communication with the media of the separation zone and communicate with a differential pressure indicator 88. The difference in hydraulic pressure between the pressure impulse conduits 86 and 87 provides a direct measure of the instantaneous average specific gravity of the separation fluid 26 between the levels of these two conduit openings. In the present invention the pressure impulse conduits 86 and 87 are maintained full of water to provide maximum control sensitivity. Any of the commercially available differential pressure indicating devices may be employed in the system, but it is preferred to use those indicators having a small volumetric displacement. For example, those differential pressure indicators having a ruptureproof bellows or diaphragm as responsive element are well suited. Such instruments give a maximum response with a minimum movement of the fluid being measured, thereby preventing substantial quantities of sand and coal particles from entering the pressure impulse conduits 86 and 87 where solids might cause plugging or damage the indicator 88. It may be desirable to provide a water purging system to flush the pressure taps intermittently or continuously.

The differential pressure indicator 88 is adapted in conventional fashion to transmit changes in indicated pressure differential into a mechanical movement through a coupling 89, for example, for driving automatic recorder controller instrument 90. The recorder controller instrument may be of any commercially available pneumatic type. A pneumatic control conduit 96, having air pressure throttled in conventional fashion by the recorder controller instrument 90, is provided for regulating pneumatically controlled valves in the water injection conduits 81, 82, 83, 84 and 85.

The above-mentioned pneumatically controlled valves, designated by the numerals 91, 92, 93, 94 and 95 respectively, are operated in response to pneumatic pressures. In such pneumatically operated valves the water flow orifices decrease in size with increasing pneumatic pressures applied to the valve operator mechanism. Cleaning plant compressed air may be used as the pneumatic source in response to the recorder controller instrument. When the recorder indicates the specific gravity within the cone to be at the predetermined, selected value, sufficient pneumatic pressure is applied from the plant system to maintain the valves at the existing orifice opening.

Should the recorder indicate a specific gravity reading within the cone in excess of the predetermined, selected value, the controller reduces the pneumatic pressure from the plant air system which will be applied to the valves, thereby increasing the orifice openings and allowing additional quantities of water to enter the cone to restore the selected value of specific gravity. On the other hand, should the recorder indicate a specific gravity reading within the cone lower than the predetermined, selected value, the controller permits more pneumatic pressure from the plant air system to be applied to the valve, thereby reducing the orifice openings and limiting the water injection through the control valves to a lower rate in order to permit the actual specific gravity to increase to the selected value.

The pressure in the pneumatic control conduit 96 is transmitted equally through conduits 97, 98, 99, 100 and 101 to the valves 91, 92, 93, 94 and 95 respectively so that each of the control valves is subject to an identical pneumatic control pressure. I have found that, surprisingly, control of the specific gravity in the actual separation zone in this manner will automatically assure that a low gravity zone is maintained beneath the actual separation zone to assure rapid downward removal of heavy impurities and the heavy "near-gravity" materials from the cone, thereby preventing accumulations which cause plugging and necessitate shutdowns in existing installations.

The actual separation zone of the system should be near the top of the heavy media and should be of sufficient depth that the float material which might otherwise become mechanically trapped by the sink material will have ample time to become disengaged in moving from the coal inlet to the overflow weir. Preferably the actual separation zone should extend from a point one to two feet below the surface of the media for a distance of about four feet.

The precise values of the desired density are determined by the float and sink data of the raw coal feed. Reverting to the coal indicated in Table I, if a product having an ash content of about 7 percent is desired, the density of the actual separation zone should be about 1.48. Under these circumstances, the recorder controller instrument 90 would be regulated to control the media density in the actual separation zone at a value of 1.48.

I have found that by using a commercially available differential pressure indicator and recorder controller along with commercially available pneumatic responsive valves, the average specific gravity of the actual separation zone can be accurately controlled to within plus or minus 0.01, provided the impulse conduits 86 and 87 are maintained full of water.

Figure 3:
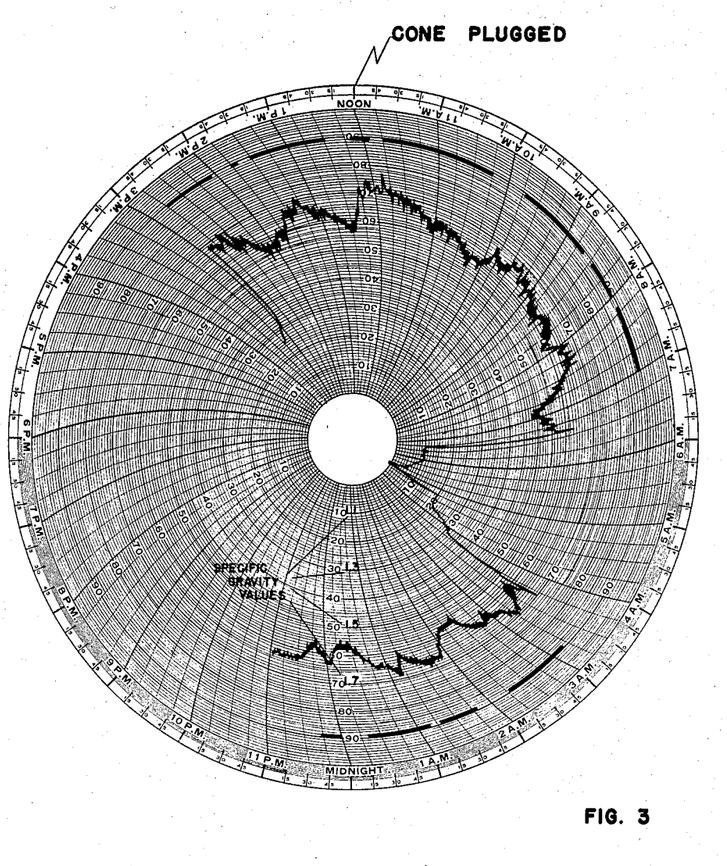
Figures 3 and 4 are reproductions of actual density recording charts illustrating the improvements resulting from the present invention.
Figure 4:
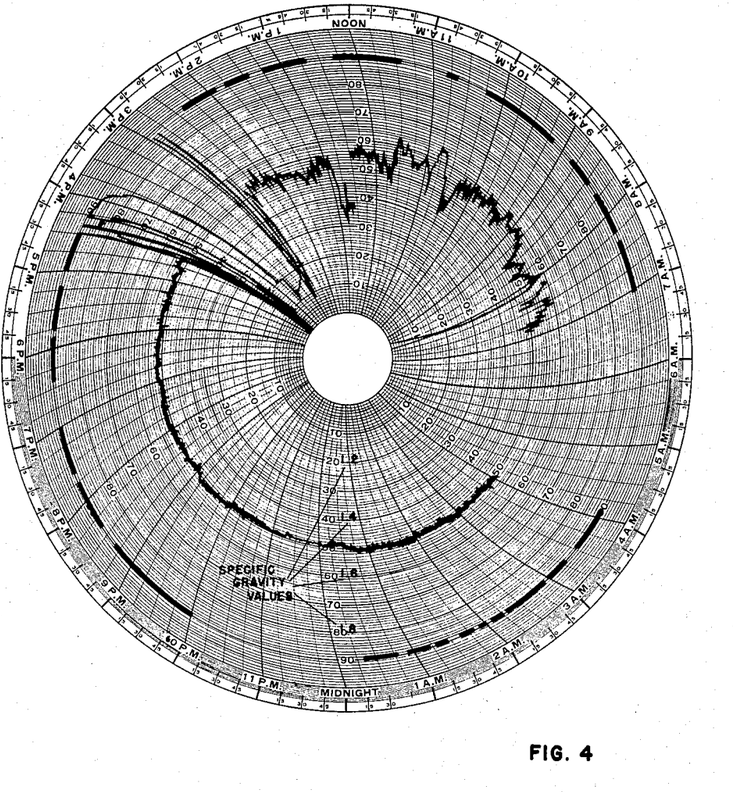

Figures 3 and 4 have been included in this application to show the improvement in cone operation resulting from the present invention.

The raw coal used in the commercial cleaning plant for the tests of Figure 3 had the following analysis.

Table II

| Specific Gravity | Differential Analysis, Wt. Percent in Fraction | Cumulative Analysis, Wt. Percent in Fraction |
|---|---|---|
| less than 1.35 | 52.1 | 52.1 |
| 1.35–1.40 | 20.9 | 73.0 |
| 1.40–1.45 | 1.7 | 74.7 |
| 1.45–1.50 | 0.7 | 75.4 |
| 1.50–1.55 | 0.4 | 75.8 |
| 1.55–1.60 | 0.4 | 76.2 |
| 1.60–1.70 | 0.5 | 76.7 |
| 1.70–1.90 | 0.5 | 77.2 |
| more than 1.90 | 22.8 | 100.0 |

As seen from Table II, the particular coal contains remarkably little "near-gravity" material. In fact, with the coal of Table II, the specific gravity of the heavy media could fluctuate quite widely between 1.40 and 1.90 and only 4.2 weight percent of the raw coal would be affected. For a separation carried out at a nominal specific gravity of 1.45, the "near-gravity" material tending to remain in suspension in the actual separation zone is only 2.8 percent of the raw coal. Nevertheless, commercial cleaning of this particular coal results in frequent plugging of the cone through accumulations of "near-gravity" materials within the cone itself.

Figure 3 is a chart taken from a continuous specific gravity recorder instrument installed in a commercial coal cleaning plant cone. The density measurements of the chart in Figure 3 were taken during normal commercial operations under the usual manual control. The heavy arcs near the periphery of the chart indicate the time during which raw coal was introduced into the cone. The desired separation density during this operation was 1.60, i. e. a theoretical recovery of 76.2 weight percent of the raw coal. Specific gravity was measured and recorded in the zone extending from 55 inches to 79 inches from the upper surface of the cone. Fluctuation of the specific gravity in the separation zone is apparent from inspection of the recording line. It is significant to note the steady gradual increase in specific gravity within the separation zone during coal feeding periods. In every instance on the chart of Figure 3 resumption of coal feeding results in an increased specific gravity in the separation zone. The cause of the increased specific gravity is the accumulation of "near-gravity" materials in the heavy media. By virtue of the fluctuating density in the separation zone the quality of the product coal was correspondingly non-uniform. The phenomenon of increasing specific gravity in the separation zone during coal feeding periods under manual control results in a continuous decline in the quality of the coal product.

In the chart of Figure 3 it is seen that the cone became plugged shortly before noon as evidenced by the significant increase in the recorded media gravity. Operationally the plugged cone was evidenced by increased load on the electric motors which rotate the agitator arms of the cone. A plant shutdown was necessitated to eliminate the plug. Thus, even with the remarkably easy-to-separate raw coal of Table II, operating difficulties are encountered in existing cone separators.

Figure 4 shows the marked improvement in cone operation which results from practicing the present invention. As shown in Figure 4 the same commercial cone cleaning apparatus was operated under manual control in the usual fashion from 7:00 a. m. through 2:30 p. m. Here the desired separation gravity was 1.50. Inspection of the recorder chart shows that the actual gravity of the heavy media varied from about 1.30 to about 1.65 during the cycle of a manual operation. From 4:30 p. m. through 4:00 a. m. the cone apparatus was operated in accordance with the present invention, i. e., with automatic control of separation zone density. It can be seen that the fluctuation of the specific gravity in the separation zone from the desired value of 1.50 was nearly negligible. It is also interesting to note that the continuing coal feeding does not result in the gradual increase in the separation zone gravity which is characteristic of manual operation. The actual separation zone for which density was measured and controlled in Figure 4 extended from 24 inches to 79 inches beneath the surface of liquid in the cone.

One obvious result of the present invention is the avoidance of accumulations in the neck of the cone which necessitate plant shutdowns. In addition, the present invention increases the yield of clean coal product from the raw coal feed. Analytical data from the operations shown in Figure 4 are tabulated in Table III.

Table III.—Coal cleaning in cone with and without automatic density control

|  | A Usual Manual Control | B Automatic Control |
|---|---|---|
| Specific Gravity of Separation | 1.53 | 1.47 |
| Percentage of Raw Coal Lighter Than Specific Gravity of Separation | 81.50 | 75.00 |
| Percentage of Raw Coal Heavier Than Specific Gravity of Separation | 18.50 | 25.00 |
| Percentage of "Near-Gravity" Material | 0.8 | 2.8 |
| Percentage of Float Coal in Refuse | 0.86 | 0.44 |
| Percentage of Sink Coal in Product | 2.16 | 1.32 |
| Ash in Raw Coal (wt. percent) | 19.80 | 24.60 |
| Ash in Product (wt. percent) | 6.10 | 5.90 |
| Efficiency of Recovering Clean Coal [1] | 99.14 | 99.56 |
| Efficiency of Rejecting Refuse [2] | 97.84 | 99.68 |

[1] Coal lighter than specific gravity of separation in product divided by raw coal lighter than specific gravity of separation (expressed as percentage).
[2] Coal heavier than specific gravity of separation in refuse divided by raw coal heavier than specific gravity of separation (expressed as percentage).

It should be emphasized that the raw coal used in these tests is that described in Table II, a readily separable material. For this particular raw coal, even wide fluctuations in the density of the separation media can be tolerated without substantial loss of recovery and rejection efficiency. Table III indicates that the separation under automatic control is carried out at a specific gravity of 1.47 whereas the separation under manual control is carried out at 1.53 specific gravity. Despite the lower gravity of separation used during the period of automatic control, more of the potential product in the raw feed was recovered than when the cone was operating without control. The recovery efficiency under automatic control is 99.56 percent whereas the efficiency under manual control was 99.14 percent. In a coal cleaning plant processing 10,000 tons of raw coal daily, this improved efficiency results in increased production of 42 tons of marketable coal per day.

The improvement effected by my present process is even more striking when the raw coal feed has substantial amounts of "near-gravity" material, which is usually the case. Tests carried out in a commercial coal cleaning plant are described in the following Table IV in which column A shows the conditions and results of operations with the conventional manual control of the cone and column B shows the conditions and results of operations conducted in accordance with the present invention. The recovery efficiency increased from 95.8 to 99.55 percent when the present invention was practiced. An additional 111 tons of marketable coal were recovered daily from a raw coal feed of 7500 tons per day.

Table IV

|  | A Usual Manual Control | B Automatic Control |
|---|---|---|
| Specific Gravity of Separation | 1.42 | 1.42 |
| Percentage of Raw Coal Lighter Than Specific Gravity of Separation | 80.9 | 80.9 |
| Percentage of Raw Coal Heavier Than Specific Gravity of Separation | 19.1 | 19.1 |
| Percentage of "Near-Gravity" Material | 30.0 | 30.0 |
| Percentage of Float Coal in Refuse | 16.1 | 2.0 |
| Percentage of Sink Coal in Product | 1.9 | 2.0 |
| Efficiency of Recovering Clean Coal [1] | 95.8 | 99.55 |
| Efficiency of Rejecting Refuse [2] | 92.2 | 91.5 |

[1] Coal lighter than specific gravity of separation in product divided by raw coal lighter than specific gravity of separation (expressed as percentage).
[2] Coal heavier than specific gravity of separation in refuse divided by raw coal heavier than specific gravity of separation (expressed as percentage).

The ash content of the recovered top product in both cases was well within the ash specification for marketable coal. Without the controls provided by the present invention, about 245 tons of marketable coal are lost in each day's production. With the present invention less than 30 tons of marketable coal are lost in the refuse piles. Moreover when using the present control system with the coal described in Table IV, no cone plugging has been experienced despite the presence of about 30 percent of "near-gravity" material in the raw coal.

Where desired the average separation density of the lower portion of the conical vessel also may be subjected to automatic control in accordance with the present invention. This may be desirable to protect the cone operator from difficulties arising through plugging of water injection conduits in the lower portion of the separation cone. If, for example, 50 percent of the water injection nozzles in the lower portion of the cone should become plugged and incapable of admitting water, insufficient density reduction would occur in the lower portion of the cone and the desired reduced specific gravity might not be obtained with a single controlled zone in the upper portion of the cone. It should be emphasized that under normal operating conditions, i. e., with all nozzles unplugged, a single controlled zone (the actual separation zone) automatically produces the desired specific gravity pattern downwardly through the separation cone. This improved apparatus will be described by reference to Figure 5.

Figure 5:
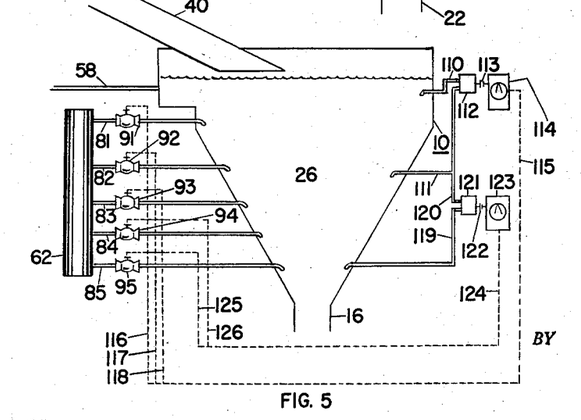
Figure 5 is a schematic illustration of apparatus for carrying out a modification of the present invention.

Figure 5 is a schematic illustration of apparatus suitable for carrying out multiple zone control of specific gravity in an inverted conical separation zone in accordance with my invention. The numerals in Figure 5 which correspond to those shown in Figure 2 indicate corresponding elements. Those elements highlighting this phase of my invention bear numerals not corresponding to those shown in Figure 2. The actual separation zone is defined vertically by the position of two pressure impulse conduits 110 and 111 which are in open communication with the media of the separation zone and communicate with a differential pressure indicator 112. The difference in hydraulic pressure between the pressure impulse conduits 110 and 111 provides a direct measure of the instantaneous average specific gravity of the separation fluid between the levels of these two conduit openings. As already stated the pressure impulse conduits preferably are maintained full of water to provide maximum control sensitivity.

The differential pressure indicating device is as described in connection with Figure 2. Mechanical coupling 113 is provided to transfer the indicated pressure differential from the meter 112 to the recorder controller instrument 114. A pneumatic control conduit 115 is maintained at a pneumatic pressure having an intensity regulated by the recorder controller instrument 114. The pressure of conduit 115 is transmitted through conduits 116, 117 and 118 to the valves 91, 92 and 93 respectively so that each of the control valves is subject to an identical pneumatic control pressure. Thus the specific gravity which is measured between the pressure impulse conduits 110 and 111 is used to control the rate of water introduction through those water injection conduits 81, 82 and 83 which are vertically within or immediately beneath the actual separation zone.

An additional pressure impulse conduit 119 is provided immediately above the lower apex of the cone 10. An auxiliary pressure tap conduit 120 communicates with the central pressure tap 111. Both the pressure taps 119 and 120 communicate with a differential pressure measuring device 121 which corresponds to the differential pressure meter 112, and indicates the difference in hydraulic pressure between the vertically separated openings of the pressure taps 111 and 119. Mechanical coupling 122 is provided to transmit the indicated pressure differential to a recorder controller instrument 123, corresponding to the instrument 114. Pneumatic pressure in a control conduit 124 is regulated by the instrument 123 to correspond to deviations between the measured specific gravity in the lower separation zone and a predetermined, selected value. The pressure in the control conduit 124 is transmitted equally through the conduits 125 and 126 to the valves 94 and 95 respectively so that each of these lower controllable valves is subjected to an identical pneumatic control pressure. Thus the rate of water injection into the lower portion of the separation cone 10 between the pressure taps 111 and 119 is regulated in response to the actual density existing in this zone.

The predetermined, selected value of specific gravity for the lower zone should be less than the predetermined, selected specific gravity for the actual separation zone. That is, the index of the recorder controller instrument 114 should have a higher value than the index of the recorder controller instrument 123. In this embodiment, those water injection conduits supplying the lower portion of the separation zone are controlled independently of the specific gravity which exists in the actual separation zone. Thus even if some of the lower nozzles in the separation cone 10 should become plugged and incapable of introducing water, the desired specific gravity pattern through the cone will be maintained automatically through the introduction of increased quantities of water through those unplugged remaining nozzles which are fed by conduits 84 and 85.

A universal problem in aqueous heavy media separations has been determining when to add additional sand to the sand circulation system. A small quantity of the sand from the aqueous heavy media is continuously lost during cone operation since the coal desanding screen 44 and the refuse desanding screen 66 do not operate at 100 percent efficiency. Make-up sand must be added intermittently to the sand sump 50 to compensate for that lost with the clean coal 48 and the refuse 68. In practice today, cone operators obtain periodic samples of the refuse solids 68 (every hour or so) to determine the amount of clean coal lost from the system. When the clean coal in the refuse stream is excessive, the operators order the addition of sand to the sand sump 50 in quantities determined largely by intuition and experience. Thus at present it is more or less guess work as to when to add sand and how much. The present invention provides a positive indication and avoids oversanding of the system.

There are two competing factors which determine the separation efficiency of a heavy media conical separation process. First, as already discussed, specific gravity of the media is the primary factor; second, from the well-known Stokes' principle, the upward velocity of the suspending stream has an important function. Both factors must be considered in selecting the exact values for maximum separation efficiency. The upward velocity component is determined by the quantity of water injected into the cone through the periphery nozzles, and the density of the recirculating sand slurry entering the top of the cone (through conduit 58, Figs. 1, 2 and 5) dictates the quantity of diluting water required by injection. When the incoming slurry at conduit 58 is quite dense, large quantities of diluent water are required to obtain the desired media density; there is a resulting high upward velocity of media tending to displace heavy material into the float product. Alternatively, if the incoming slurry at conduit 58 has a low density, very little diluting water is needed to obtain the desired media density; the resulting low upward velocity of the media allows some normally light material to be displaced into the sink fraction.

When large quantities of water are needed for media dilution, a correspondingly low air pressure is required to maintain the pneumatic control valves 91, 92, 93, 94 and 95 in a nearly full-open position. Conversely when only small quantities of water are required for diluting an already dilute incoming sand slurry at conduit 58, a correspondingly large air pressure is required to maintain the pneumatic control valves 91, 92, 93, 94 and 95 in a nearly closed position.

Thus I have discovered that the absolute value of the regulated air supply which controls the pneumatic valves provides a direct index to the quantity of sand in the recirculating system and also an index to the upward velocity of media within the separator. The cone operator can further assure uniform product quality and high efficiency by maintaining this regulated air pressure within narrow limits which can be determined readily for any given separator installation. When the regulated pressure drops below the minimum value, normal conditions can be restored by adding sand to the recirculating sand system until the regulated pressure is restored to a value within this narrow range. A pressure indicator 102 (Fig. 2) for measuring the pneumatic pressure in the valve operating conduit 96 can be installed for this purpose.

If desired, an additional recording stylus for controlled air pressure similar to the recording stylus 26, may be incorporated in the meter 90 as an alternative to the meter 102. A recording stylus of this type provides a continuous record of the pressure in conduit 96 (hence a continuous record of the quantity of sand in the system).

In some solids separation processes for use with coals, particularly, having a large fraction of medium density material, provision is made for recovering in addition to a float product and a sink refuse, a middlings fraction, all from one separator. This is accomplished by maintaining a low density separation zone (e. g., 1.40 specific gravity) near the top of the separator for floating the low density coal and a subjacent medium density zones ( e. g., 1.60 specific gravity) near the bottom of the separator for deliberate accumulation of medium density coal. A middlings product recovery system is provided for removing the medium density material which accumulates between the low and medium density zones. High density refuse (e. g., greater than 1.60 specific gravity) passes downwardly through both zones for removal. In general, the development of the multiple product recovery separators has been tantamount to an admission that existing separators are unable to obtain a sharp separation based upon specific gravity and an engineering decision has been made to remove accumulated material rather than to prevent the accumulations. Nevertheless, in processing certain coals which do possess a large fraction of light, low ash material and also a large fraction of heavier high ash material, suitable as fuel in some burner installations, the principles of the present invention can be applied to the multiple product recovery separators to sharpen the separation and improve efficiency of recovery of float, middlings and refuse streams.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. In the method of separating solid materials with differing specific gravities under the action of a dense aqueous separation media in a conical separation zone, which method comprises introducing a concentrated slurry of separation media comprising water and comminuted solids heavier than water into the top of said separation zone, introducing a quantity of clear water peripherally into said separation zone at a plurality of levels thereof, introducing solid materials of differing specific gravity into the top of said separation zone, recovering those solid materials having a low density from the top of said separation zone and recovering those solid materials having a high density from the lower apex of said separation zone, the improvement comprising the steps of establishing three horizontal contiguous zones within said separation zone, continuously measuring the differential hydrostatic pressure across the central horizontal zone, and regulating peripheral water introduction in response to the deviation of the measured pressure differential from a predetermined, selected value.

2. In the method of separating solid materials with differing specific gravities under the action of a dense aqueous separation media in a conical separation zone which method comprises introducing a concentrated slurry of separation media comprising water and comminuted solids heavier than water into the top of said separation zone, introducing a quantity of clear water peripherally into said separation zone at a plurality of levels thereof, introducing solid materials of differing specific gravity into the top of said separation zone, recovering those solid materials having a low density from the surface of said separation zone and recovering those solid materials having a high density from the lower apex of said separation zone, the improvement comprising the steps of establishing three horizontal contiguous zones within said separation zone, continuously measuring the differential hydrostatic pressure across the central horizontal zone, continuously measuring the differential hydrostatic pressure across the lower horizontal zone, introducing a quantity of clear water peripherally into the upper and central horizontal zones in response to the deviation of the measured differential pressure in said central horizontal zone from a first predetermined, selected value, and introducing a quantity of clear water peripherally into the lower horizontal zone in response to the deviation of the measured differential pressure in said lower separation zone from a second predetermined, selected value, which is lower than said first predetermined, selected value.

3. In the method of separating solid materials with differing specific gravities under the action of a dense aqueous separation media in a conical separation zone which method comprises introducing a concentrated slurry of separation media comprising water and comminuted solids heavier than water into the top of said separation zone, introducing a quantity of clear water peripherally into said separation zone at a plurality of levels thereof, introducing solid materials of differing specific gravity into the top of said separation zone, recovering those solid materials having a low density from the surface of said separation zone and recovering those solid materials having a high density from the lower apex of said separation zone, the improvement comprising the steps of continuously measuring the differential hydrostatic pressure across a central horizontal zone within said separation zone, positioning a continuous recording device in response to the measured differential pressure, and regulating peripheral water introduction in response to deviation of the position of said recording device from a predetermined, selected position.

4. In the method of separating solid materials with differing specific gravities under the action of a dense aqueous separation media in a conical separation zone which method comprises introducing a concentrated slurry of separation media comprising water and comminuted solids heavier than water into the top of said separation zone, introducing a quantity of clear water peripherally into said separation zone at a plurality of levels thereof, introducing solid materials of differing specific gravity into the top of said separation zone, recovering those solid materials having a low density from the surface of said separation zone and recovering those solid materials having a high density from the lower apex of said separation zone, the improvement comprising the steps of continuously measuring the differential hydrostatic pressure across a central horizontal zone within said separation zone, positioning a continuous recording device in response to the measured differential pressure, regulating the pressure of a pneumatic air supply in response to deviations of said recording device from a predetermined, selected position, and regulating peripheral water injection in response to the pneumatic air supply pressure so regulated.

5. In the method of separating solid materials with differing specific gravities under the action of a dense aqueous separation media in a conical separation zone which method comprises introducing a concentrated slurry of separation media comprising water and comminuted solids heavier than water into the top of said separation zone, introducing a quantity of clear water peripherally into said separation zone at a plurality of levels thereof, introducing solid materials of differing specific gravity into the top of said separation zone, recovering those solid materials having a low density from the surface of said separation zone and recovering those solid materials having a high density from the lower apex of said separation zone, the improvement comprising the steps of continuously measuring the differential hydrostatic pressure across a central horizontal zone within said separation zone, continuously measuring the differential hydrostatic pressure across a lower horizontal zone within said separation zone beneath said central zone, positioning a first continuous recording device in response to the measured differential pressure of said central zone, regulating the peripheral water introduction into the top portion of said separation zone in response to deviations of said first continuous recording device from a first predetermined, selected value, positioning a second continuous recording device in response to the measured differential pressure of said lower zone and regulating the peripheral water introduction into the bottom portion of said separation zone in response to deviations of said second continuous recording device from a second predetermined, selected value which is lower than said first predetermined, selected value.

6. In the method of separating solid materials with differing specific gravities under the action of a dense aqueous separation media in a conical separation zone, which method comprises introducing a concentrated slurry of separation media comprising water and comminuted solids heavier than water into the top of said separation zone, introducing a quantity of clear water peripherally into said separation zone at a plurality of levels thereof, introducing solid materials of differing specific gravity into the top of said separation zone, recovering those solid materials having a low density from the top of said separation zone and recovering those solid materials having a high density from the lower apex of said separation zone, the improved method for determining the quantity of comminuted solids in the separation system comprising the steps of continuously measuring the differential hydrostatic pressure across a central horizontal zone within said separation zone, regulating a pneumatic pressure supply in response to deviations of (1) said differential hydrostatic pressure from (2) a predetermined, selected value, regulating peripheral water injection in response to the pneumatic pressure supply so regulated and measuring the regulated pneumatic supply pressure as an index of the quantity of comminuted solids in the separation system.

7. In an apparatus for carrying out a solids separation process to recover a float product and a sink product by using an aqueous separation media comprising a conical separation vessel for containing a body of said aqueous separation media, means for introducing a dense slurry of water and comminuted solids heavier than water into top of said vessel, injection means including injection conduits for introducing clear water into said conical vessel at a plurality of levels along the conical surface of said vessel, means for introducing solid materials having different specific gravities into the top of said vessel, means for recovering a float product from the top of said vessel and means for recovering a sink product from the bottom of said vessel, the improvement comprising in combination means for continuously measuring the average specific gravity in a central horizontal frustum section of separation media within said vessel, controlable valves in said injection conduits for regulating the flow of water and valve controlling means responsive to the deviation of the measured average specific gravity from a predetermined value for actuating said controllable valves.

8. In an apparatus for carrying out a solids separation process to recover a float product and a sink product by using an aqueous separation media comprising a conical separation vessel for containing a body of said aqueous separation media, means for introducing a dense slurry of water and comminuted solids heavier than water into top of said vessel, injection means including injection conduits for introducing clear water into said conical vessel at a plurality of levels along the conical surface of said vessel, means for introducing solid materials having different specific gravities into the top of said vessel, means for recovering a float product from the top of said vessel and means for recovering a sink product from the bottom of said vessel, the improvement comprising in combination controllable valves in said injection means, two vertically separated pressure taps within said vessel, means for continuously measuring the differential hydrostatic pressure existing within said vessel between said pressure taps, control means for continuously comparing the measured hydrostatic differential pressure between said pressure taps with a predetermined, selected value and means for continuously regulating said controllable valves in response to deviations between said measured hydrostatic pressure differential and said predetermined value.

9. In an apparatus for carrying out a solids separation process to recover a float product and a sink product by using an aqueous separation media comprising a conical separation vessel for containing a body of said aqueous separation media, means for introducing a dense slurry of water and comminuted solids heavier than water into top of said vessel, injection means including injection conduits for introducing clear water into said conical vessel at a plurality of levels along the conical surface of said vessel, means for introducing solid materials having different specific gravities into the top of said vessel, means for recovering a float product from the top of said vessel and means for recovering a sink product from the bottom of said vessel, the improvement comprising in combination controllable valves in said injection means, two vertically separated pressure taps extending into said vessel, expansible measuring means for indicating the hydrostatic pressure differential between said pressure taps, and control means for regulating said controllable valves, said control means being responsive to deviations between (1) said hydrostatic pressure differential indicated by said measuring means and (2) a predetermined, selected value.

10. In an apparatus for carrying out a solids separation process to recover a float product and a sink product by using an aqueous separation media comprising a conical separation vessel for containing a body of said aqueous separation media, means for introducing a dense slurry of water and comminuted solids heavier than water into top of said vessel, injection means including injection conduits for introducing clear water into said conical vessel at a plurality of levels along the conical surface of said vessel, means for introducing solid materials having different specific gravities into the top of said vessel, means for recovering a float product from the top of said vessel and means for recovering a sink product from the bottom of said vessel, the improvement comprising in combination pneumatically responsive control valves in said injection means, two vertically separated pressure taps extending into said vessel, expansible measuring means for indicating the hydrostatic pressure differential between said pressure taps, and control means for regulating a pneumatic pressure supply to which said control valves are responsive, said control means being responsive to deviations between (1) said hydrostatic pressure differential indicated by said measuring means and (2) a predetermined, selected value.

11. In an apparatus for carrying out a solids separation process to recover a float product and a sink product by using an aqueous separation media comprising a conical separation vessel for containing a body of said aqueous separation media, means for introducing a dense slurry of water and comminuted solids heavier than water into top of said vessel, injection means including injection conduits for introducing clear water into said conical vessel at a plurality of levels along the conical surface of said vessel, means for introducing solid materials having different specific gravities into the top of said vessel, means for recovering a float product from the top of said vessel and means for recovering a sink product from the bottom of said vessel, the improvement comprising in combination pneumatically responsive control valves in said injection means, two vertically separated pressure taps extending into said vessel, expansible measuring means for indicating the hydrostatic pressure differential between said pressure taps, control means for regulating a pneumatic pressure supply to which said control valves are responsive, said control means being responsive to deviations between (1) said hydrostatic pressure differential indicated by said measuring means and (2) a predetermined, selected value, and means for indicating the pneumatic pressure so regulated to provide an indication of the quantity of sand in the system.

12. In an apparatus for carrying out a solids separation process to recover a float product and a sink product by using an aqueous separation media comprising a conical separation vessel for containing a body of said aqueous separation media, means for introducing a dense slurry of water and comminuted solids heavier than water into top of said vessel, injection means including injection conduits for introducing clear water into said conical vessel at a plurality of levels along the conical surface of said vessel, means for introducing solid materials having different specific gravities into the top of said vessel, means for recovering a float product from the top of said vessel and means for recovering a sink product from the bottom of said vessel, the improvement comprises in combination pneumatically responsive control valves in said injection means, a first pressure tap near the top of said vessel beneath the surface of said media, a second pressure tap in the central portion of said vessel, a third pressure tap near the bottom of the conical portion of said vessel, a first expansible measuring means for indicating the hydrostatic pressure differential between said first and second pressure taps, first control means for regulating a pneumatic pressure supply to which said control valves associated with the upper portion of said vessel are responsive, said first control means being responsive to deviations between the indication of said first measuring means and a first predetermined, selected value, a second expansible measuring means for indicating the hydrostatic pressure differential between said second and third pressure taps, and second control means for regulating a pneumatic pressure supply to which said control valves associated with the lower portion of said vessel are responsive, said second control means being responsive to deviations between the indication of said second measuring means and a second predetermined, selected value which is lower than said first predetermined, selected value.

References Cited in the file of this patent

UNITED STATES PATENTS

| | | |
|---|---|---|
| 1,937,190 | Chance | Nov. 28, 1933 |
| 2,320,519 | Hirst | June 1, 1943 |
| 2,596,352 | Wuensch | May 13, 1952 |

OTHER REFERENCES

Shafer: "Coal Preparation by the Tramp Dense-Liquor Process," Colliery Engineering, January 1939, pages 18–22.

"The Evolution of Cleaning Coal With Dense Media" 1951, Nelson L. Davis Co. Bull., Fig. 18 and page 16.